No. 681,791. Patented Sept. 3, 1901.
O. HUFFMAN.
TRAP.
(Application filed May 11, 1901.)
(No Model.)
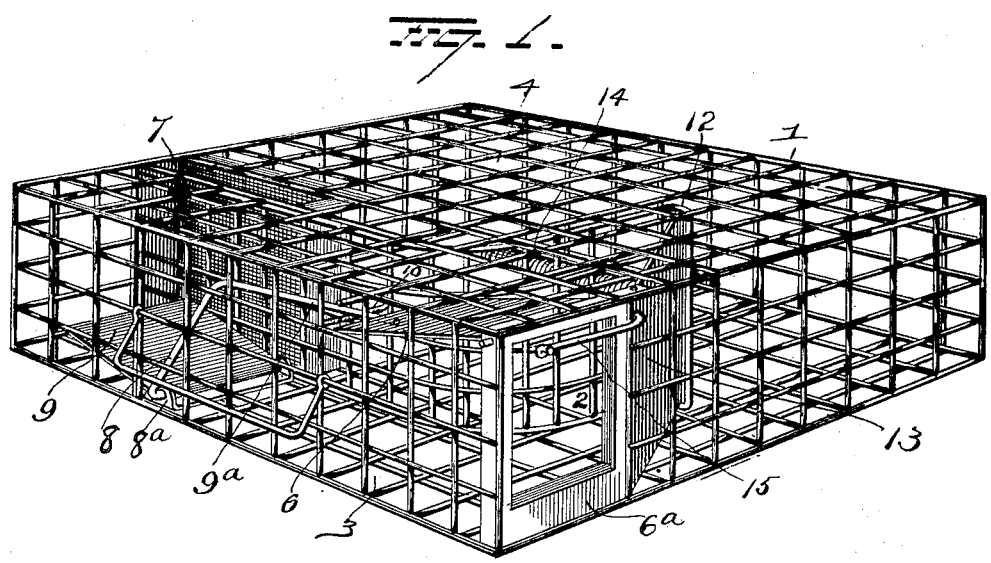
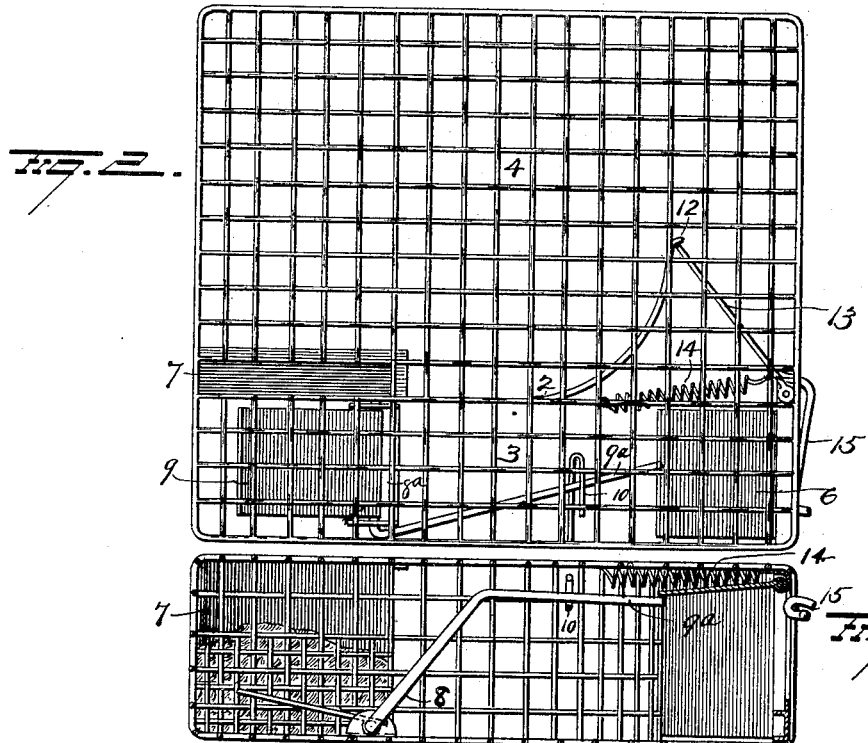
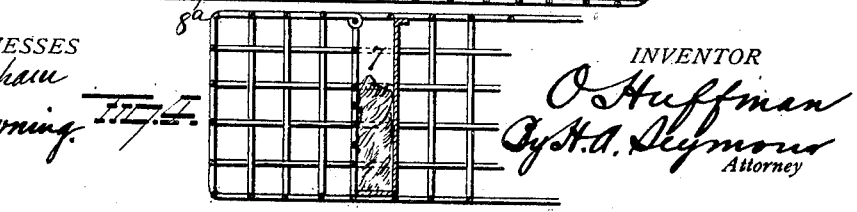
WITNESSES
INVENTOR
O. Huffman
Attorney

UNITED STATES PATENT OFFICE.

ORLANDO HUFFMAN, OF BEATRICE, NEBRASKA, ASSIGNOR OF TWO-THIRDS TO HENRY FISHBACK AND WILLIAM BOSWORTH, OF SAME PLACE.

TRAP.

SPECIFICATION forming part of Letters Patent No. 681,791, dated September 3, 1901.

Application filed May 11, 1901. Serial No. 59,755. (No model.)

*To all whom it may concern:*

Be it known that I, ORLANDO HUFFMAN, a resident of Beatrice, in the county of Gage and State of Nebraska, have invented certain new and useful Improvements in Traps; and I do hereby declare the following to be a full, clear, and exact description of the invention, such as will enable others skilled in the art to which it appertains to make and use the same.

My invention relates to an improvement in traps, and more particularly to traps for small animals—such as rats, mice, and the like—the object of the invention being to provide an improved trap which will be reset by an entrapped animal passing from one compartment into another.

With this object in view the invention consists in certain novel features of construction and combinations and arrangements of parts, as will be more fully hereinafter described and pointed out in the claim.

In the accompanying drawings, Figure 1 is a view illustrating my improvements. Fig. 2 is a top view, and Figs. 3 and 4 are views in section.

1 represents the outer wall or casing of the trap, which is rectangular in general shape and composed, preferably, of woven wire or wire-netting of a mesh sufficiently small and strong to prevent the escape of an entrapped animal. The casing 1 is divided by a vertical partition 2 into an entrance-chamber 3 and a cage 4, whose communication with the entrance-chamber is normally closed by a spring-pressed door 13, as will be more fully hereinafter explained. The entrance-chamber 3 is provided with an inlet-opening at one end thereof, closed by a door 6, hinged at its upper edge and adapted when closed to fit into a door-frame $6^a$ and prevent possibility of outward movement thereof. A bait-receptacle 7 is secured to the partition 2 at the inner end of entrance-chamber 3 and is composed of sheet metal open at its side adjacent to the partition and the entrance-chamber and at its top for the admission of the bait, which opening may be closed by a cover or any other approved means. In the entrance-chamber 3 beside the bait-receptacle a platform 9 is located and secured at one edge to a rod or shaft 8, supported in bearings $8^a$ in the base or bottom of the chamber. The rod 8 is bent at one edge of the platform and extends upward and forward, forming a trigger $9^a$, which latter is loosely supported in a guide-bracket 10, secured to and projecting inward from one side of the entrance-chamber to permit of slight upward movement of the trigger when engaged by the free end of the door 6 as the latter is moved inward, and when the door is raised to its highest position it will be moved up free of the trigger and fall upon the same when released and be thereby retained in its open position until the trigger is drawn inward by the weight of the animal on the platform 9 in his endeavor to eat the bait, and when the door is released it will fall of its own weight into its closed position in frame $6^a$ and prevent any possibility of its being opened by the animal. The partition 2, above referred to, is composed, preferably, of wire netting or mesh and is curved at one end, as shown, forming a passage from the entrance-chamber into the cage and is bent vertically to form a housing 12 to receive the free end of a door 13. The door 13 is hinged to one side of the casing and when in its closed position is disposed at an incline to the entrance and has connected to its upper edge one end of a spring 14, the other end of said spring being secured to the top of the cage and adapted to hold the door 13 in its closed position; but owing to the incline of the door any pressure of an animal thereagainst from the entrance-chamber will open it and permit the animal to pass into the cage, the door springing shut after the animal and preventing any possibility of his return. The door 13 has secured thereto an arm 15, which when the door is swung open is moved against the door 6 and raises the latter until it is engaged by the trigger. Thus it will be seen that when an animal passes from the entrance-chamber into the cage the mere opening of the door 13 serves to open the door 6 and set the trap for the next victim.

The operation of my improvements is as follows: The animal, scenting the bait, enters the entrance-chamber and in his endeavors to eat the bait treads upon platform 9, thus operating trigger $9^a$ to release door 6 and permit it to fall to its closed position, and the animal finding himself caught endeavors to escape and presses against door 13, which readily yielding to his pressure he rushes through into the cage only to find himself securely caught, for he cannot return through the door. The opening of door 13 by the animal brings the arm 15 against door 6 and opens it to be caught by the trigger $9^a$, and the trap is again set.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

In a trap, the combination with a receptacle, a partition in said receptacle dividing it into an entrance-chamber and a cage, a door for the entrance-chamber, a trigger for holding said door open, and a platform in the entrance-chamber for releasing the trigger, of a door between the entrance-chamber and cage, a spring for normally holding said door closed, an arm on the hinged edge of the last-mentioned door to open the first-mentioned door when the last-mentioned door is opened by the animal, and said partition bent to receive the free end of the door to prevent its being opened from the cage.

In testimony whereof I have signed this specification in the presence of two subscribing witnesses.

ORLANDO HUFFMAN.

Witnesses:
JACOB AUCH,
W. A. PENNER.